United States Patent
Choi (10) Patent No.: US 12,157,174 B2
(45) Date of Patent: Dec. 3, 2024

(54) FACING MACHINE FOR PREVENTING INFLOW OF CUTTING CHIPS INTO TUBE

(71) Applicant: DCSENG CO. LTD., Chungcheongbuk-do (KR)

(72) Inventor: In Sung Choi, Daejeon (KR)

(73) Assignee: DCSENG CO. LTD.

( * ) Notice: Subject to any disclaimer, the term of this patent is extended or adjusted under 35 U.S.C. 154(b) by 458 days.

(21) Appl. No.: 17/310,703

(22) PCT Filed: Sep. 3, 2019

(86) PCT No.: PCT/KR2019/011318
§ 371 (c)(1),
(2) Date: Aug. 18, 2021

(87) PCT Pub. No.: WO2020/262758
PCT Pub. Date: Dec. 30, 2020

(65) Prior Publication Data
US 2022/0193796 A1    Jun. 23, 2022

(30) Foreign Application Priority Data
Jun. 28, 2019 (KR) .......................... 10-2019-0078079

(51) Int. Cl.
B23B 5/16 (2006.01)
B23C 3/12 (2006.01)
B23C 5/02 (2006.01)

(52) U.S. Cl.
CPC ................ *B23C 3/122* (2013.01); *B23C 5/02* (2013.01); *B23B 5/163* (2013.01)

(58) Field of Classification Search
CPC .......... B23C 3/122; B23C 5/02; B23B 5/163; B23B 2200/0471; B23B 2200/086; B23B 2200/32
See application file for complete search history.

(56) References Cited

U.S. PATENT DOCUMENTS 3,661,472 A * 5/1972 Beauloye ................ B23B 5/168
 30/92
4,319,503 A * 3/1982 Saine ...................... B23B 5/163
 408/104

(Continued)

FOREIGN PATENT DOCUMENTS

CN    101480727 B    12/2010
CN    105598518 A    5/2016

(Continued)

OTHER PUBLICATIONS

Chinese Office Action for the related Application No. 201980093363.5 dated Aug. 10, 2023, 7 pages.

(Continued)

*Primary Examiner* — Sara Addisu
(74) *Attorney, Agent, or Firm* — Honigman LLP; Brett A. Krueger (57) ABSTRACT

A tube-facing machine includes a driving unit including a driving shaft and a motor for rotating the driving shaft, a cutting unit including a cutting tip mounted to the front end of the driving shaft and having a blade, and a tube-mounting unit. The cutting tip is disposed such that an angle between an imaginary reference line extending outwards from the center point of the tube in a radial direction and an imaginary line extending from the center point of the tube to a point at which the blade meets the inner circumference of the tube in a rotating direction of the cutting tip is greater than an angle between the imaginary reference line and another imaginary line extending from the center point of the tube to a point at which the blade meets the outer circumference of the tube in the rotating direction of the cutting tip.

6 Claims, 10 Drawing Sheets

(56) References Cited

U.S. PATENT DOCUMENTS

| | | | | |
|---|---|---|---|---|
| 5,619,893 | A * | 4/1997 | Pierce | B23B 5/163 82/111 |
| 5,711,197 | A * | 1/1998 | Ohmi | B23B 5/163 408/104 |
| 5,960,686 | A * | 10/1999 | Bonow | B23B 5/163 33/645 |
| 6,186,037 | B1 * | 2/2001 | Ricci | B23B 5/163 82/131 |
| 6,460,438 | B2 * | 10/2002 | Richards | B23B 5/163 82/128 |
| 6,609,447 | B2 * | 8/2003 | Richards | B23B 5/163 408/67 |
| 2001/0001934 | A1 * | 5/2001 | Richards | B23B 5/163 82/123 |
| 2017/0028481 | A1 | 2/2017 | Sato et al. | |

FOREIGN PATENT DOCUMENTS

| | | |
|---|---|---|
| CN | 105792968 A | 7/2016 |
| JP | 2002187094 A | 7/2002 |
| JP | 2002520167 A | 7/2002 |
| JP | 2016093860 A | 5/2016 |
| KR | 1003912280000 A | 11/2003 |
| KR | 1020070114110 A | 4/2009 |
| KR | 101862315 B1 | 7/2018 |

OTHER PUBLICATIONS

European Search Report for the related Applciation No. 19935290.7 dated Jun. 23, 2023, 10 pages.

* cited by examiner

FACING MACHINE FOR PREVENTING INFLOW OF CUTTING CHIPS INTO TUBE

BACKGROUND

Technical Field

The present disclosure relates to a tube-facing machine, and more particularly to a tube-facing machine having a structure for preventing chips, which are generated when cutting an end portion of a tube, from entering the tube.

Description of the Related Art

When a metal tube is cut, burrs may be formed at the end thereof, or the end thereof may be bent in the inner radial direction thereof. Such a burr or bent end of a tube may impede the smooth flow of a fluid through the tube, or may pose many problems when assembling tubes. In particular, when tubes are butt-welded to each other, the ends of neighboring tubes that face each other are not completely contiguous with each other, leading to welding defects. Therefore, it is required to additionally trim the uneven surface of the end of the tube so as to make the same even.

Conventionally, an end of a tube is trimmed using equipment such as a lathe. In recent years, however, a portable tube-facing machine has been developed and used. Specifically, the recently developed portable tube-facing machine is formed in the approximate shape of a pistol such that a tube is fixed to a muzzle thereof. The portable tube-facing machine includes a rotary shaft, which has a certain length and is provided inside a barrel thereof, a cutting tip, which is mounted to the front end of the rotary shaft, and a motor, which is configured to rotate the rotary shaft in response to manipulation of a driving button, thereby cutting an end portion of a tube. In addition, a discharge hole for discharging chips is formed in the side surface of the portion of the barrel at which the cutting tip is disposed, whereby chips generated in the course of cutting a tube are discharged through the discharge hole.

However, the conventional tube-facing machine described above has a problem in which chips generated when cutting a tube scratch the inner circumferential surface of the precision-machined tube due to the shape of the tube and the arrangement and structural characteristics of the cutting tip. Further, when the conventional tube-facing machine continuously cuts a tube, a long chip is generated and becomes entangled, thereby making it difficult to discharge the chip to the outside of the tube-facing machine. Furthermore, when removing chips present inside the tube-facing machine through the discharge hole, a worker faces the risk of getting a cut on the hand from the sharp chips or being severely injured if the driving button is pressed by accident.

Therefore, there is the need to develop a tube-facing machine capable of automatically discharging a chip generated when cutting a tube to the outside thereof and of restricting the length of a chip to a predetermined length.

(Patent Document 0001) Korean Patent Registration No. 10-1862315 (entitled "COMPLEX MACHINE FOR CHAMFERING INNER AND OUTER CIRCUMFERENCES OF PIPE")

(Patent Document 0002) Korean Patent Laid-Open Publication No. 10-2007-0114110 (entitled "POWERED TOOL FOR CUTTING AND PROCESSING TUBE", the corresponding disclosure relating to a powered tool for cutting and processing a tube, and more particularly to a powered tube tool that is portable and hand manipulable)

SUMMARY

The present disclosure has been made in view of the above problems, and it is advantageous to provide a tube-facing machine capable of preventing a chip generated when cutting a tube from being introduced into the tube and of immediately cutting the continuously generated chip so as to restrict the length of the chip to a predetermined length.

However, the implementations to be accomplished by the present disclosure are not limited to the above-mentioned implementation, and other implementations not mentioned herein will be clearly understood by those skilled in the art from the following description.

In accordance with an aspect of the present disclosure, the above and other implementations can be accomplished by the provision of a tube-facing machine for cutting an end surface of a tube, the tube-facing machine including a driving unit including a motor configured to rotate a driving shaft and a housing accommodating the rear end of the driving shaft and the motor, a cutting unit including a cutting tip mounted to the front end of the driving shaft and having a blade formed perpendicular to the driving shaft, and a tube-mounting unit formed in a pipe shape, wherein the tube-mounting unit is connected to the front portion of the housing to accommodate the cutting unit, and wherein the tube-mounting unit allows a tube to be cut to be mounted in the front end portion thereof so as to be concentric therewith, wherein the cutting tip may be disposed such that the blade formed at the cutting tip is in contact with a portion of an end surface of the tube so as to be perpendicular thereto and such that an angle between an imaginary reference line extending outwards from the center point of the tube in a radial direction and an imaginary line extending from the center point of the tube to a point at which the blade meets the inner circumference of the tube in a rotating direction of the cutting tip is greater than an angle between the imaginary reference line and another imaginary line extending from the center point of the tube to a point at which the blade meets the outer circumference of the tube in the rotating direction of the cutting tip.

The cutting tip may be formed in a polyhedral shape, the blade may be formed at an edge of one surface of the cutting tip, and in the one surface of the cutting tip, a depressed portion having a depressed shape may be formed along the direction in which the blade is formed.

The depressed portion may be formed to have an arc-shaped side-section.

More specifically, the depressed portion may be formed such that the diameter thereof gradually increases in one direction, and the cutting tip may be disposed to be in contact with the tube such that the portion of the depressed portion having the largest diameter is oriented toward the outside of the tube.

In addition, the blade may be formed at each of the edges of two surfaces of the cutting tip that are not adjacent to each other. When the blade formed at one edge is worn out, the direction in which the cutting tip is mounted may be changed so that the blade formed at another edge is used.

In addition, the tube-mounting unit may have a discharge hole formed in a side surface thereof, on which the cutting tip is disposed, to discharge chips therethrough.

In accordance with another aspect of the present disclosure, there is provided a tube-facing machine including a driving unit including a driving shaft and a housing, the driving shaft including a first shaft having a rear end connected to a motor and a front end formed in a polygonal shape and a second shaft having a rear end having a recess formed therein in a shape corresponding to the front end of the first shaft so as to be axially connected to the first shaft and a middle portion having a small diameter to have an adjustment recess formed therein, and the housing accommodating the rear end of the first shaft and the motor, a cutting unit including a cutting tip mounted to the front end of the second shaft, a tube-mounting unit formed in the shape of a pipe having a discharge hole formed in a side surface thereof to discharge chips therethrough, wherein the tube-mounting unit is connected to the front portion of the housing to accommodate the cutting unit, and wherein the tube-mounting unit allows a tube to be cut to be mounted in the front end portion thereof so as to be concentric therewith, and an adjustment unit including a bearing inserted into the adjustment recess and having a moving protrusion formed to extend outwards, wherein the moving protrusion is configured to move the second shaft forwards or backwards upon application of external force, and a return spring configured to return backwards the moving protrusion and the second shaft that have been moved forwards by external force.

The adjustment unit may further include a guide bushing formed in a pipe shape, the guide bushing having a front end fixed to the tube-mounting unit, a rear end fixed to the housing, and a guide slot formed in a side surface thereof and extending to a predetermined length in a forward-backward direction. The moving protrusion may be inserted into the guide slot, whereby the range within which the moving protrusion moves in the forward-backward direction may be restricted.

In addition, the adjustment unit may further include a moving member formed in the shape of a pipe having a predetermined length and surrounding the guide bushing, wherein the moving member has a protrusion-receiving recess formed in the inner surface thereof to receive the upper end portion of the moving protrusion and a screw groove formed in the outer surface thereof, and wherein the moving member moves along the outer surface of the guide bushing in the forward-backward direction, and an adjustment member formed in a pipe shape, the adjustment member being disposed outside the moving member and coupled to the moving member in a screw engagement manner. The moving member may be moved forwards or backwards in response to rotation of the adjustment member. The return spring may have one end fixed to the adjustment member and an opposite end fixed to the front end of the housing, and may be torsionally deformed in response to rotation of the adjustment member upon application of external force. When the external force is removed, the return spring may be restored to an original shape thereof and may return the moving member to an original position of the moving member.

More specifically, the screw groove formed in the outer surface of the moving member may be a ball-screw groove, and a ball-screw nut may be formed in the inner side surface of the adjustment member.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Before explaining embodiments of the present disclosure in detail with reference to the accompanying drawings, it is to be understood that the phraseology and terminology used in the following specification and appended claims should not be construed as being limited to general and dictionary meanings but should be construed as having meanings and concepts according to the spirit of the present disclosure on the basis of the principle that the inventor is permitted to define appropriate terms for the best explanation.

The embodiments described in this specification and shown in the accompanying drawings are illustrative only and are not intended to represent all aspects of the disclosure, and thus it is to be understood that various equivalents and modifications can be made without departing from the spirit of the invention.

Hereinafter, the technical features of the present disclosure will be described in more detail with reference to the accompanying drawings. The accompanying drawings are included to provide a further understanding of the invention, and illustrate embodiments of the disclosure together with the detailed description. However, the technical features of the present disclosure are not limited to specific drawings, and the features shown in the drawings may be combined to construct new embodiments.

Figure 1:
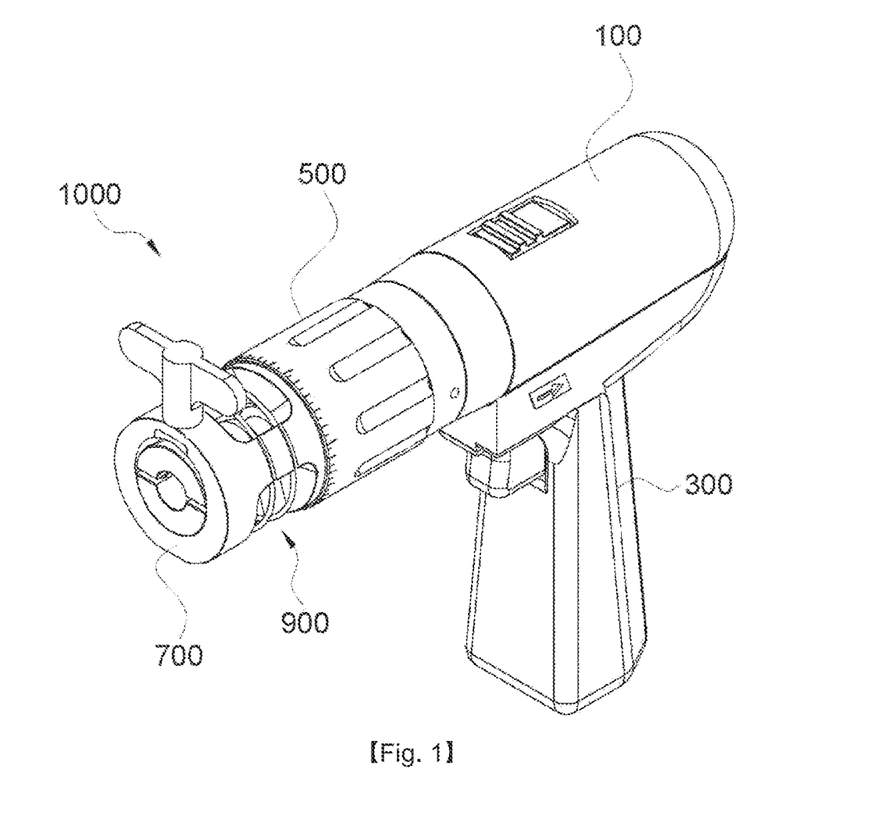
FIG. 1 is a perspective view of a tube-facing machine according to an exemplary embodiment of the present disclosure.

FIG. 1 is a perspective view of a tube-facing machine according to an exemplary embodiment of the present disclosure.

A tube-facing machine 1000 according to an exemplary embodiment of the present disclosure is an apparatus for cutting a tube and making the cut surface of the tube even. As shown in FIG. 1, the tube-facing machine 1000 is formed in the approximate shape of a pistol, and broadly includes a driving unit 100, a grip 300, an adjustment unit 500, a tube-mounting unit 700, and a cutting unit 900.

The driving unit 100 substantially serves to drive a cutting tip, which is a component for cutting an end portion of a tube, so that the cutting tip rotates along the circumference of the tube.

Figure 2:
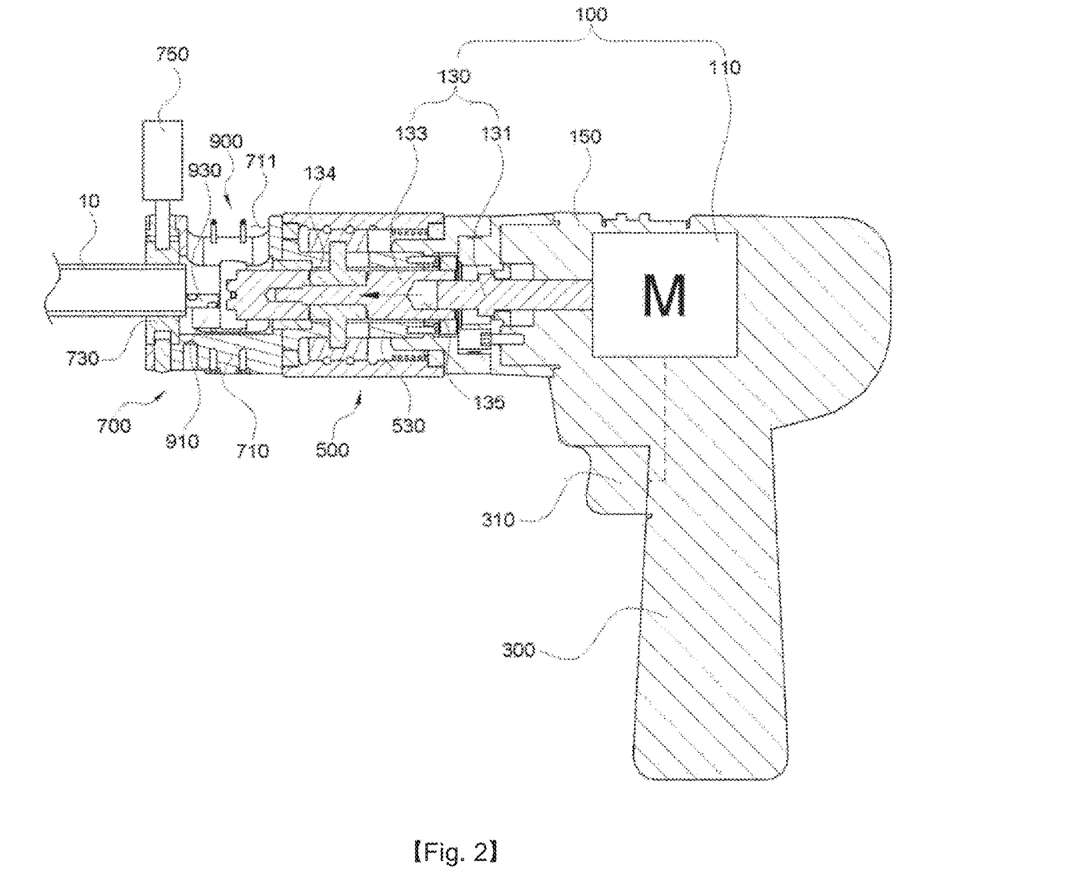
FIG. 2 is a side-sectional conceptual view of the tube-facing machine according to the exemplary embodiment of the present disclosure.
Figure 3:
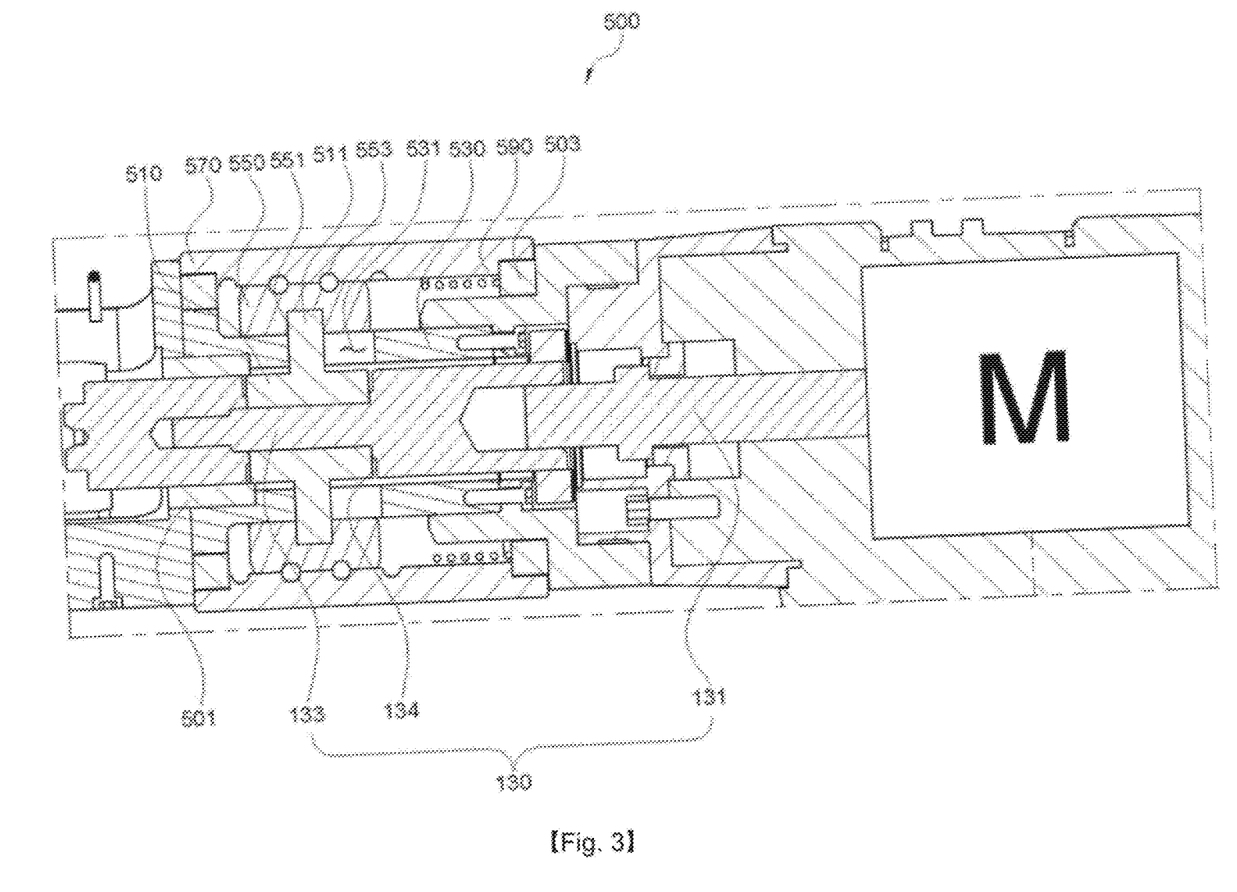
FIG. 3 is a partially enlarged view of FIG. 2.
Figure 4:
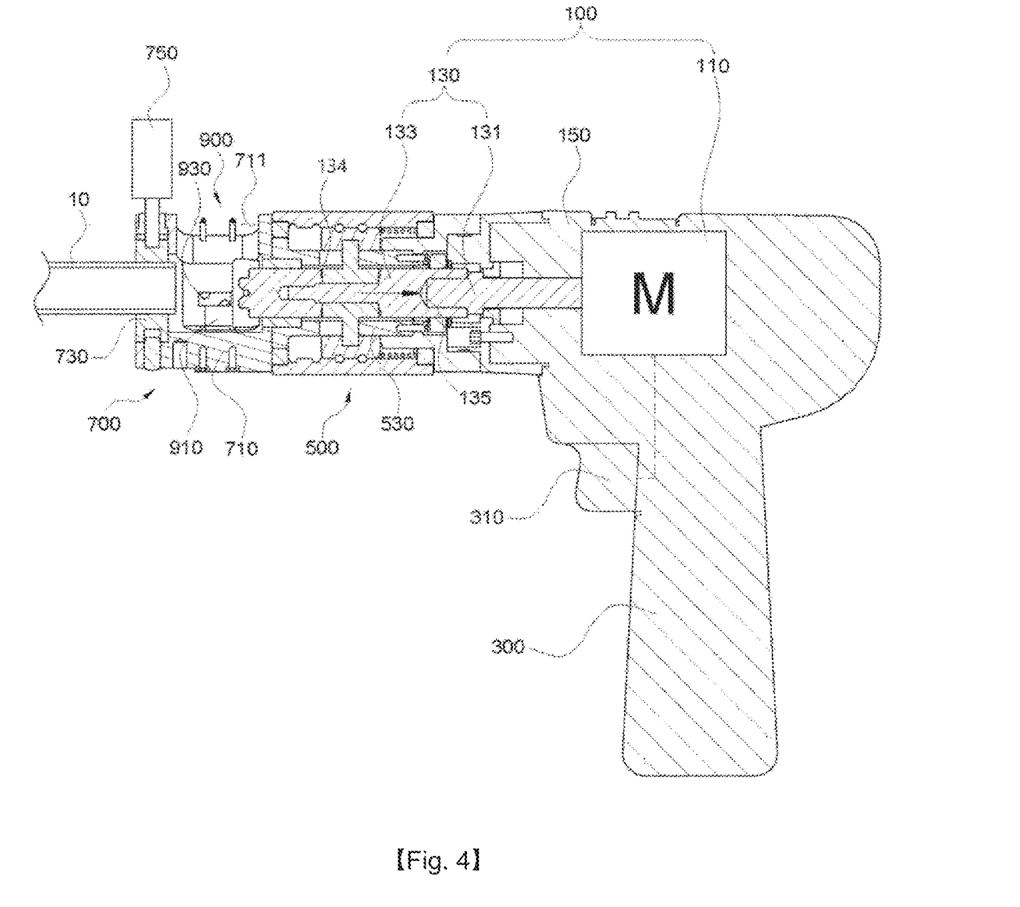
FIG. 4 is a side-sectional conceptual view showing the state in which a cutting tip of the tube-facing machine according to the exemplary embodiment of the present disclosure is moved backwards.
Figure 5:
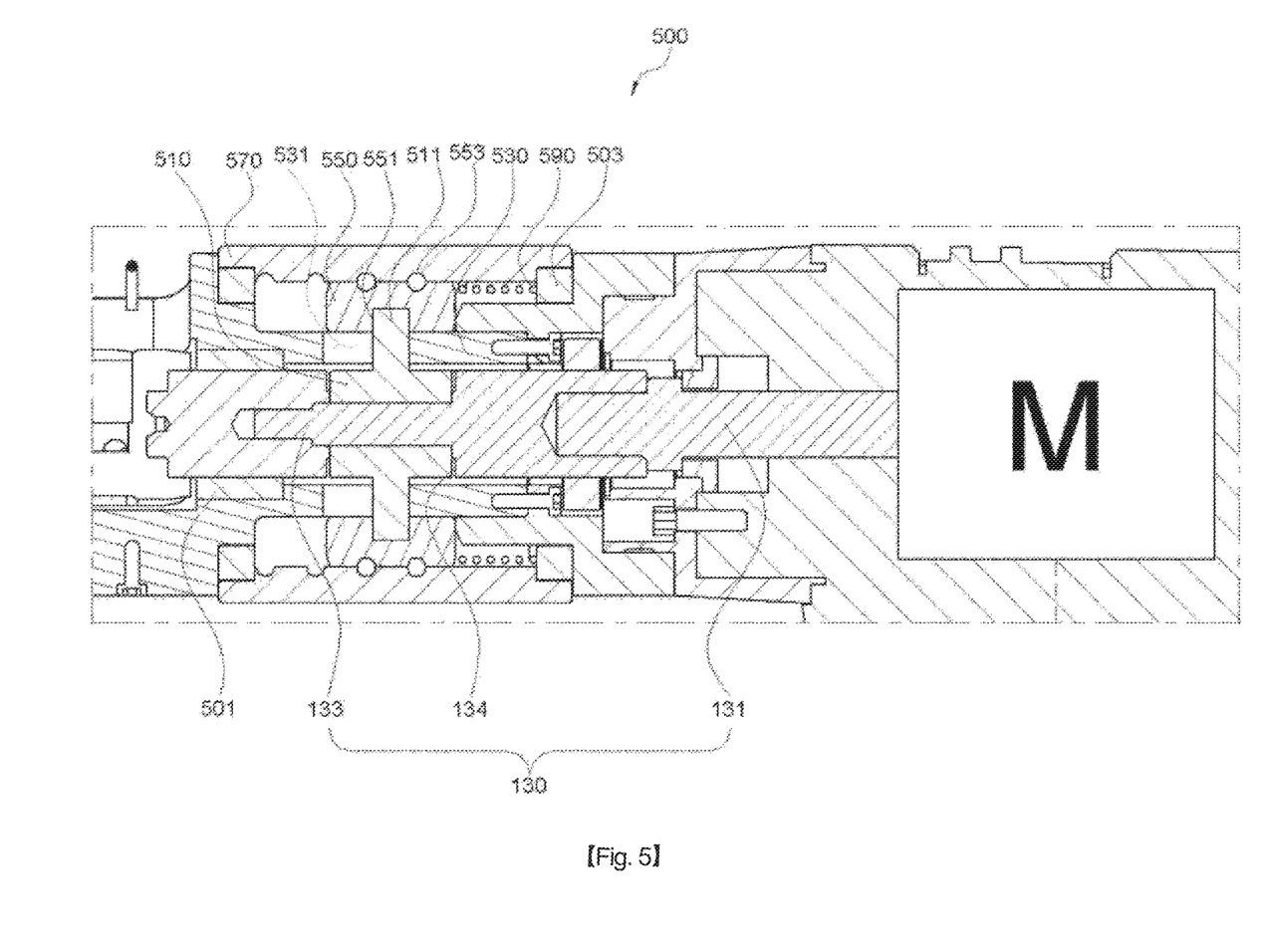
FIG. 5 is a partially enlarged view of FIG. 4.

FIG. 2 is a side-sectional conceptual view of the tube-facing machine according to the exemplary embodiment of the present disclosure, FIG. 3 is a partially enlarged view of FIG. 2, FIG. 4 is a side-sectional conceptual view showing the state in which the cutting tip of the tube-facing machine according to the exemplary embodiment of the present disclosure is moved backwards, and FIG. 5 is a partially enlarged view of FIG. 4.

As shown in FIGS. 2 to 5, the driving unit 100 includes a motor 110, a driving shaft 130, and a housing 150.

Specifically, the motor 110 is connected to the rear end of the driving shaft 130 to rotate the driving shaft 130.

The driving shaft 130 is configured such that a first shaft 131 and a second shaft 133 are axially connected to each other. The first shaft 131 has a front end, which is formed in a polygonal shape, and a rear end, which is connected to the motor 110 to receive driving force therefrom. The second shaft 133 is formed in a rod shape, and has a middle portion having a smaller diameter than the remainder thereof so as to form therein an adjustment recess 134, and a rear end having a coupling recess 135 formed therein in a shape corresponding to the front end of the first shaft 131 so as to be axially connected to the front end of the first shaft 131. Due to the structural characteristics of connection between the front end of the first shaft 131 and the coupling recess 135, the second shaft 133 is capable of rotating integrally with the first shaft 131 and is also capable of moving in a forward-backward direction relative to the first shaft 131, thereby enabling adjustment of the overall length of the driving shaft 130. For reference, FIGS. 2 and 3 show the state in which the length of the driving shaft 130 is increased by moving the second shaft 133 in the forward direction, and FIGS. 4 and 5 show the state in which the length of the driving shaft 130 is decreased by moving the second shaft 133 in the backward direction. The cutting unit 900 including a cutting tip 930 is coupled to the front end of the second shaft 133, which will be described in detail later after the adjustment unit 500 and the tube-mounting unit 700 are described.

The housing 150 is formed so as to accommodate the rear end of the first shaft 131 and the motor 110, and the grip 300 extends downwards from the housing 150. The grip 300 is provided at one side thereof with a driving button 310 to control the operation of the motor 110.

The adjustment unit 500 is a component for adjusting the position of the cutting tip 930 coupled to the front end of the second shaft 133 by moving the second shaft 133 in the forward-backward direction. The adjustment unit 500 includes a bearing 510, a guide bushing 530, a moving member 550, an adjustment member 570, and a return spring 590.

The bearing 510 is inserted into the adjustment recess 134 formed in the second shaft 133, and has a moving protrusion 511 formed to extend outwards. Here, the bearing 510 is a rolling bearing, which includes an inner race and an outer race. When the second shaft 133 is rotated, the inner race is rotated together therewith, but the outer race and the moving protrusion 511 formed at the outer race are not influenced by the rotation of the second shaft 133.

The guide bushing 530 is formed in a pipe shape. The guide bushing 530 is disposed concentrically with the driving shaft 130 such that the inner circumferential surface thereof is spaced a predetermined distance apart from the outer circumferential surface of the driving shaft 130 and such that the rear end thereof is fixed to the front portion of the housing 150. In addition, the guide bushing 530 has a guide slot 531 formed in the side surface thereof and extending long in the forward-backward direction. The moving protrusion 511 is received in the guide slot 531, and thus the range within which the moving protrusion 511 moves in the forward-backward direction is defined by the guide slot 531. Here, when the moving protrusion 511 is moved in the forward-backward direction along the guide slot 531, the second shaft 133 is also moved in the forward-backward direction together therewith.

The moving member 550 is formed in the shape of a pipe that surrounds the outer circumferential surface of the guide bushing 530. However, the moving member 550 is formed to be shorter than the guide bushing 530. The moving member 550 has a protrusion-receiving recess 551, formed in the inner circumferential surface thereof to receive the upper end portion of the moving protrusion 511, and a ball-screw groove 553, formed in the outer circumferential surface thereof. The moving member 550 is coupled to the guide bushing 530 so as to be movable in the forward-backward direction along the outer circumferential surface of the guide bushing 530. When the moving member 550 is moved, the moving protrusion 511, which is received in the protrusion-receiving recess 551, and the second shaft 133 are also moved together therewith.

The adjustment member 570 is formed in the shape of a pipe that is longer than the moving member 550, and is disposed outside the moving member 550 so as to be concentric with the moving member 550. The adjustment member 570 has a ball-screw nut formed in the inner side surface thereof that engages with the ball-screw groove 553 in the moving member 550 in a ball-screw engagement manner.

The adjustment member 570 is rotatably fitted between the housing 150 and the tube-mounting unit 700, which will be described later, in the state of being fixed in position in the forward-backward direction. Accordingly, when the adjustment member 570 is rotated in the clockwise or counterclockwise direction about the driving shaft, the moving member 550, which is coupled to the adjustment member 570 in the ball-screw engagement manner, is moved forwards or backwards. At this time, the second shaft 133 and the cutting tip 930 are also moved along with movement of the moving member 550.

The return spring 590 is implemented as a general coil spring, and is disposed so as to surround the driving shaft 130. One end of the return spring 590 is fixed to the inner side surface of the adjustment member 570, and the opposite end thereof is fixed to the housing 150. The return spring 590 is mounted such that the same enters a normal state when the adjustment member 570 moves the moving member 550 to the rearmost position. When the adjustment member 570 is rotated by external force applied thereto in order to move the moving member 550 forwards, the return spring 590 is torsionally deformed and generates elastic force. When the external force is removed, the adjustment member 570 is rotated in the reverse direction by the elastic restoring force of the return spring 590, and accordingly, the moving member 550 is moved to the rearmost position, which is the original position thereof. For reference, in order to enable the elastic force of the return spring 590 to be sufficiently exhibited, the ball-screw groove formed in the outer circumferential surface of the moving member 550 is formed to have a very large lead value (moving distance per rotation).

In summary, as the adjustment member 570 of the adjustment unit 500 is rotated is one direction, the moving member 550, the moving protrusion 511, and the second shaft 133 are moved forwards, whereby the position of the cutting tip 930, which is mounted to the front end of the second shaft 133, may be adjusted in the forward-backward direction.

Further, when the adjustment member 570 is rotated in one direction by external force applied thereto, the return spring 590 generates elastic force, and when the external force applied to the adjustment member 570 is removed, the adjustment member 570 is automatically rotated in the reverse direction by the return spring 590, whereby the moving protrusion 511 and the second shaft 133 are immediately moved backwards.

In addition, a sliding bearing 501 may be further provided between the driving shaft 130 and the guide bushing 530 in order to further facilitate the movement of the second shaft 133 in the forward-backward direction, and a position-fixing ring 503 may be mounted to each of the front end and the rear end of the adjustment member 570.

In addition, concave recesses (not shown) may be formed in the outer surface of the adjustment member 570 so as to be arranged at regular intervals along the outer circumferential surface of the adjustment member 570, and a stopper (not shown) may be provided at the portion of the housing 150 that is contiguous with the adjustment member 570. The stopper may be configured so as to be slidable only in the forward-backward direction. When sliding forwards, the front end of the stopper may be inserted into any one of the concave recesses, thereby preventing the adjustment member 570 from rotating, and when sliding backwards, the front end of the stopper may escape from the corresponding one of the concave recesses, thereby allowing the adjustment member 570 to rotate.

The tube-mounting unit 700 includes a head 710, a holding jig 730, and a fastening member 750. The head 710 is formed in the shape of a pipe, which has a discharge hole 711 formed in the side surface thereof to discharge chips therethrough. The head 710 is fixed to or is formed integrally with the front end of the guide bushing 530. The cutting unit 900 is accommodated in the head 710. In this case, the position at which the discharge hole 711 is formed may correspond to the position at which the cutting tip 930 is disposed. A tube 10 to be cut is inserted into the front end portion of the head 710 so as to be concentric with the head 710. In order to securely fix the tube 10, which may have any of various diameters, the holding jig 730 is provided in a pair, each one thereof having a semicircular shape, and the pair of holding jigs 730 is inserted into the front end portion of the head 710. The fastening member 750 is disposed at one side of the head 710 in order to adjust the gap between the pair of holding jigs 730. Since the holding jigs 730 and the fastening member 750 have the same configurations as those of the related art, a detailed description thereof will be omitted.

For reference, the tube 10 is inserted into the gap between the pair of holding jigs 730 and is fixed by the fastening member 750.

The cutting unit 900 includes a tip-fixing frame 910 and a cutting tip 930.

The tip-fixing frame 910 is formed in the shape of a plate, and protrudes forwards from the front end of the second shaft 133. The tip-fixing frame 910 is disposed so as to be eccentric from the center of the second shaft 133, and has a screw hole formed in an upward-downward direction in the center portion thereof. In addition, the tip-fixing frame 910 may further have a support wall protruding upwards from the edge thereof that is adjacent to the center of the second shaft 133.

Figure 6:
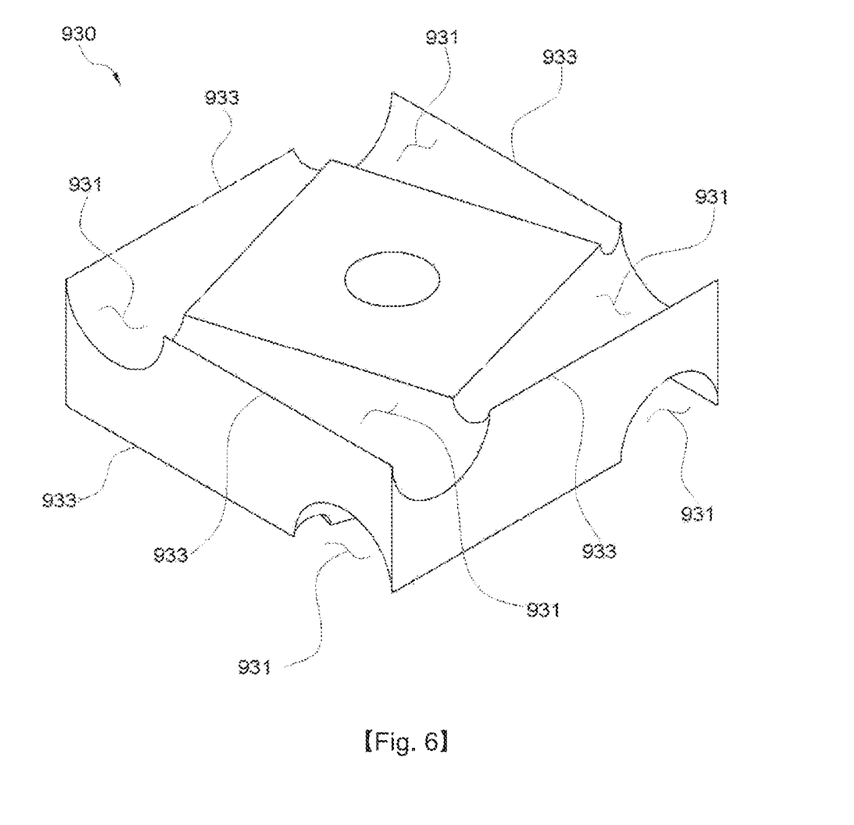
FIG. 6 is a perspective view showing the cutting tip of the tube-facing machine according to the exemplary embodiment of the present disclosure.

FIG. 6 is a perspective view showing the cutting tip of the tube-facing machine according to the exemplary embodiment of the present disclosure.

As shown in FIG. 6, the cutting tip 930 is formed in a rectangular parallelepiped shape. In particular, the cutting tip 930 is formed to be flat such that the length thereof in the upward-downward direction is shorter than the length thereof in the leftward-rightward direction and the length thereof in the forward-backward direction, and has a screw hole formed in the upward-downward direction in the center portion thereof. The cutting tip 930 includes blades 933, which are formed at respective edges of two surfaces thereof that are not adjacent to each other, specifically, the upper surface and the lower surface thereof, and depressed portions 931, which are depressed in an arc shape and extend along the edges of the upper and lower surfaces thereof in the direction in which the blades 933 are formed. In this case, each of the depressed portions 931 is formed such that the diameter thereof gradually increases in one direction. Further, each of the depressed portions 931 is formed such that the radius of curvature thereof gradually increases in one direction. The reason why the cutting tip 930 has the configuration described above is to induce the diameter of a chip to be gradually decreased when the chip curls up in a spiral shape in the process of cutting a tube, thereby reducing the volume of the chip and thus reducing tangling of the chip. Further, since the blades 933 are formed at respective edges of the upper surface and the lower surface of the cutting tip 930, when the blade 933 formed at one edge is worn out, a worker is capable of changing the direction in which the cutting tip 930 is mounted so as to use the blade 933 formed at another edge. Accordingly, it is possible to use eight blades 933 before replacing the cutting tip 930, so the cutting tip 930 is economically feasible.

Figure 7:
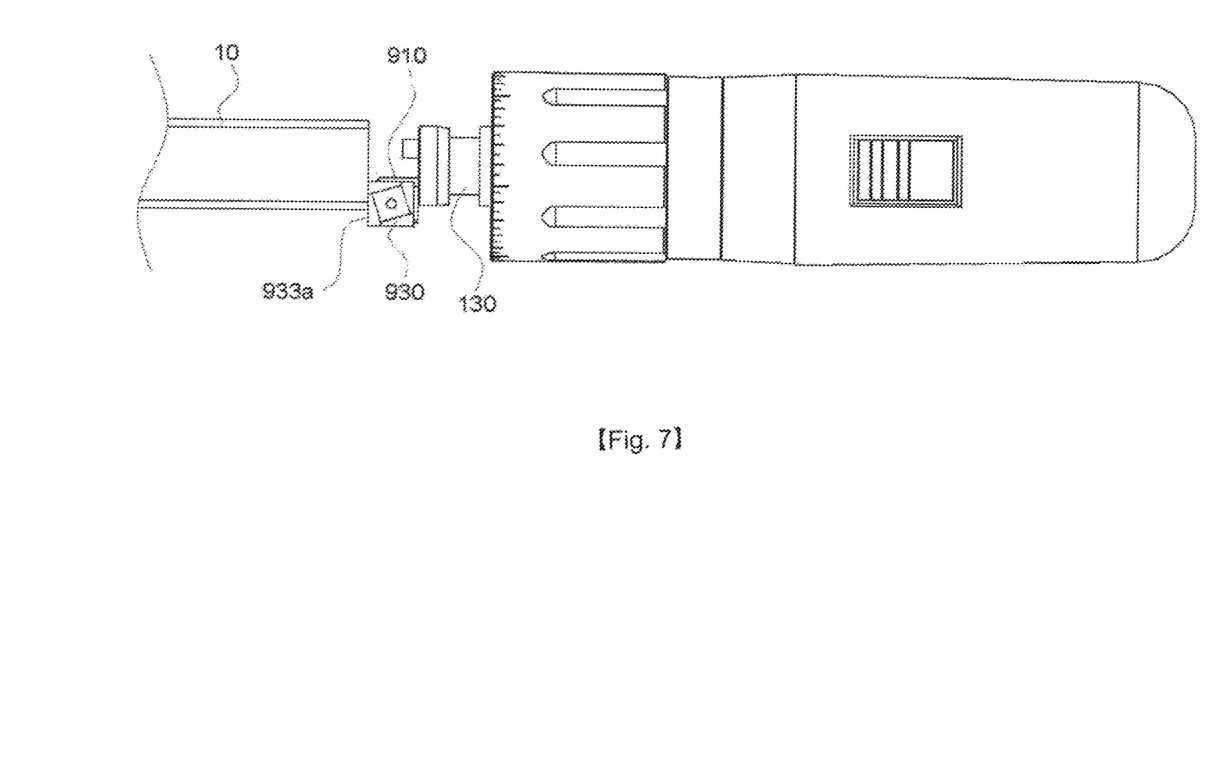
FIG. 7 is a plan conceptual view showing the mounted state of the cutting tip of the tube-facing machine according to the exemplary embodiment of the present disclosure.

FIG. 7 is a plan conceptual view showing the mounted state of the cutting tip of the tube-facing machine according to the exemplary embodiment of the present disclosure.

As shown in FIG. 7, the cutting tip 930 may be mounted such that the cutting tip 930 is placed on the upper surface of the tip-fixing frame 910 and is then fixed to the tip-fixing frame 910 by fastening a screw into the screw holes formed in the cutting tip 930 and the tip-fixing frame 910. At this time, the blade 933 formed at one edge of the cutting tip 930 is oriented perpendicular to the driving shaft 130. The length of the cutting tip 930 in the forward-backward direction is greater than that of the tip-fixing frame 910, so the front end portion of the cutting tip 930 is located at a position further forward than the tip-fixing frame 910. When the cutting tip 930 is mounted to the tip-fixing frame 910, the blade 933, which is located ahead of the tip-fixing frame 910, becomes the blade 933a to be used to cut the end surface of the tube 10. More specifically, among the blades 933 located ahead of the tip-fixing frame 910, the blade 933 formed in the direction in which the driving shaft 130 rotates becomes the blade 933a to be used to cut the end surface of the tube 10. The blade 933a to be used to cut the end surface of the tube 10 may be in contact with a portion of the end surface of the tube 10 in the state of being inclined with respect to the end surface of the tube 10. It is preferable that the blade 933a to be used to cut the end surface of the tube 10 and the end surface of the tube 10 be in contact with each other in the state of being perpendicular to each other.

Figure 8:
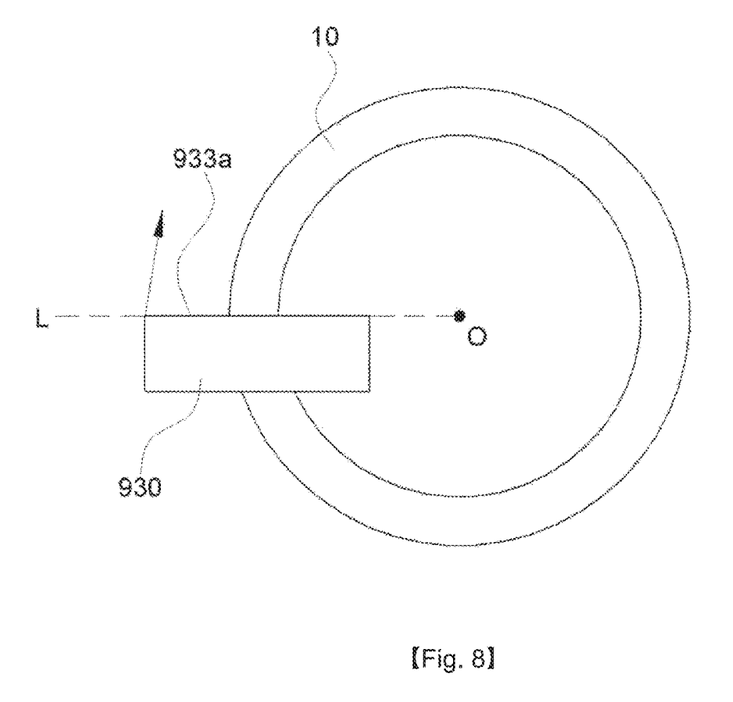
FIG. 8 is a front conceptual view showing the arrangement structure of a cutting tip of a conventional tube-facing machine and a tube.

FIG. 8 is a front conceptual view showing the arrangement structure of a cutting tip of a conventional tube-facing machine and a tube.

As shown in FIG. 8, according to a conventional tube-facing machine, the blade 933a of the cutting tip 930 that cuts the end surface of the tube 10 is disposed so as to be aligned with an imaginary reference line L, which extends outwards from the center point O of the tube 10 in the radial direction, thus incurring a problem in which chips generated when cutting the tube 10 are introduced into the tube 10 due to the shape characteristics of the tube 10.

Figure 9:
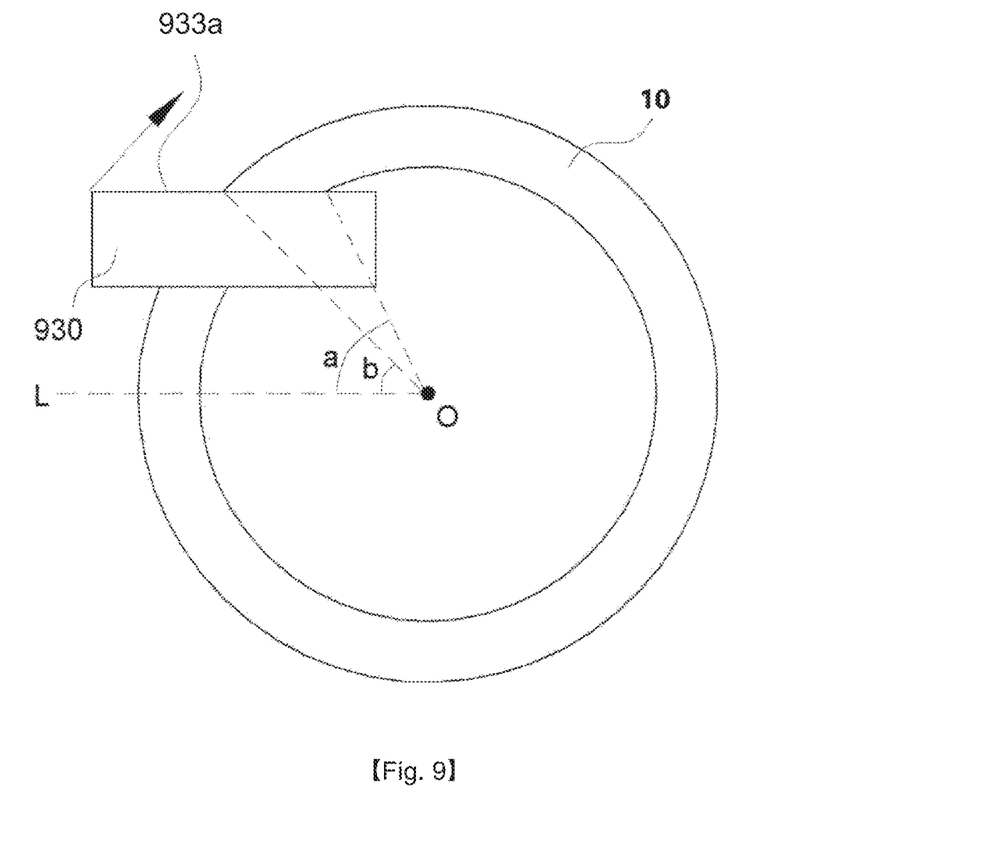
FIG. 9 is a front conceptual view showing the arrangement structure of the cutting tip of the tube-facing machine according to the exemplary embodiment of the present disclosure and a tube.

FIG. 9 is a front conceptual view showing the arrangement structure of the cutting tip of the tube-facing machine according to the exemplary embodiment of the present disclosure and a tube.

In order to solve the above problem, as shown in FIG. 9, the cutting tip 930 of the tube-facing machine according to the exemplary embodiment of the present disclosure is disposed such that an angle a between an imaginary reference line L extending outwards from the center point O of the tube 10 in the radial direction and an imaginary line extending from the center point O of the tube 10 to the point at which the blade 933a meets the inner circumference of the tube 10 in the rotating direction of the cutting tip 930 is greater than an angle b between the imaginary reference line L and another imaginary line extending from the center O of the tube 10 to the point at which the blade 933a meets the outer circumference of the tube 10 in the rotating direction of the cutting tip 930. Since the blade 933a of the cutting tip 930 is misaligned from the imaginary reference line L as described above, chips generated in the rotating direction of the cutting tip 930 are automatically guided in the outward direction of the tube 10, thereby preventing the chips from being introduced into the tube 10.

Figure 10:
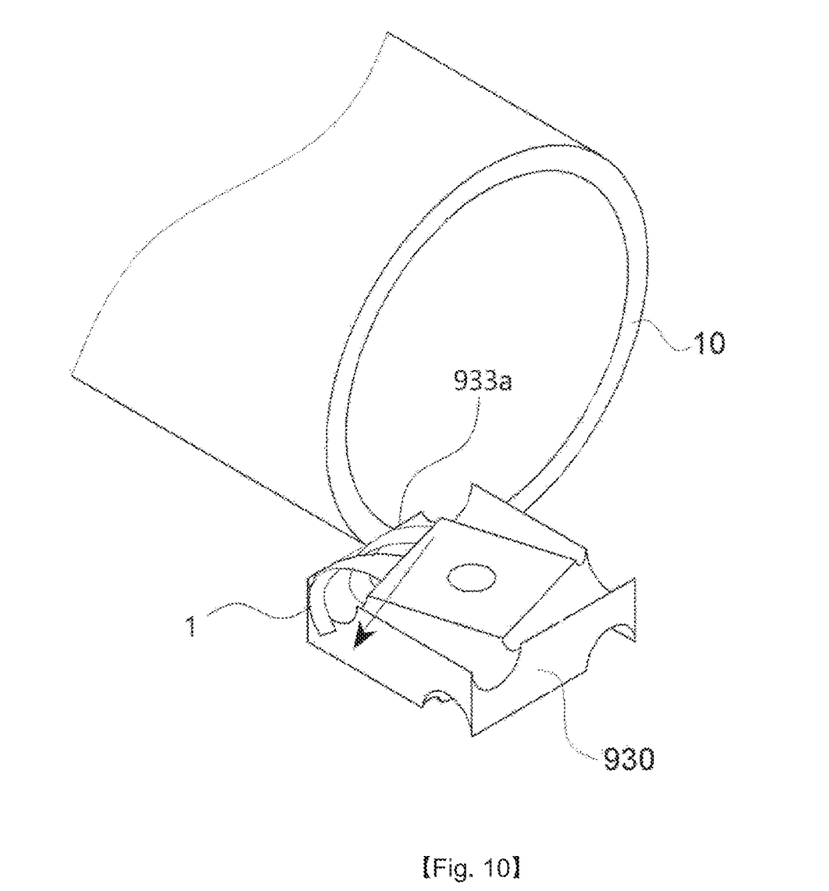
FIG. 10 is a perspective view showing the state in which the cutting tip of the tube-facing machine according to the exemplary embodiment of the present disclosure cuts an end surface of a tube.

FIG. 10 is a perspective view showing the state in which the cutting tip of the tube-facing machine according to the exemplary embodiment of the present disclosure cuts the end surface of a tube.

The depressed portion 931 corresponding to the blade 933a that cuts the end surface of the tube 10 is disposed such that the portion having the largest diameter and the largest radius of curvature is oriented toward the outside of the tube 10, whereby the generated chip 1 is guided to the outside of the tube 10 by the depressed portion 931. Accordingly, it is possible to more effectively prevent the chip 1 from being introduced into the tube 10 and to automatically discharge the chip 1 guided to the outside of the tube 10 through the discharge hole 711.

In addition, due to the above-described shape of the depressed portion 931 in which the radius of curvature thereof gradually increases in the direction toward the outside of the tube 10, the diameter of the chip is decreased when the chip curls up in a spiral shape compared to the related art, thereby making it possible to prevent the chip from becoming entangled. Further, since the volume of the chip is decreased, discharge of the chip through the discharge hole 711 is facilitated.

In addition, during the process of cutting the end surface of the tube 10, when there is concern about tangling of the chip 1 due to formation of the chip 1 to a length exceeding a predetermined length, a worker stops applying external force to the adjustment member 570 in order to immediately move the cutting tip 930, which is in contact with the end surface of the tube 10, away from the end surface of the tube 10, thereby rapidly cutting the continuously generated chip 1.

As is apparent from the above description, the tube-facing machine according to the present disclosure configured as described above is capable of preventing a chip generated when cutting a tube from being introduced into the tube due to the arrangement characteristics of the cutting tip.

In addition, the generated chip is guided to the outside of the tube and thus automatically discharged through the discharge hole due to the shape characteristics of the depressed portion.

In addition, since a plurality of blades and a plurality of depressed portions are formed at a single cutting tip, the cutting tip may be used multiple times until all of the blades are worn out.

In addition, it is possible to rapidly cut the continuously generated chip using the elastic restoring force of the return spring, thereby preventing tangling of the chip.

In addition, the position of the cutting tip may be precisely adjusted using the moving member and the adjustment member, which are coupled to each other in a ball-screw engagement manner.

The present disclosure should not be construed as being limited to the above-mentioned exemplary embodiment. The present disclosure may be applied to various fields and may be variously modified by those skilled in the art without departing from the scope of the present invention claimed in the claims. Therefore, it will be apparent to those skilled in the art that such alterations and modifications fall within the scope of the present invention.

INDUSTRIAL APPLICABILITY

The facing machine according to the present disclosure is capable of preventing a chip from being introduced into a tube and of automatically discharging the chip to the outside of the tube through the discharge hole due to the structure of the cutting tip and the depressed portion. In addition, since a plurality of blades and a plurality of depressed portions are formed at a single cutting tip, the cutting tip may be used multiple times until all of the blades are worn out. In addition, it is possible to prevent tangling of the chip using the elastic restoring force of the return spring. In addition, the position of the cutting tip may be precisely adjusted using the moving member and the adjustment member, which are coupled to each other in a ball-screw engagement manner. In view of these effects, the present disclosure overcomes the limitations of the conventional art. Accordingly, not only can the present disclosure be employed in related technologies and impart sufficient salability or marketability to apparatuses to which the present disclosure is applied, but it will also be apparent that the present disclosure can be implemented in practice, and thus the present invention has industrial applicability.

What is claimed is:

1. A tube-facing machine, comprising:
a driving unit comprising a driving shaft and a housing, the driving shaft comprising a first shaft having a rear end connected to a motor and a front end formed in a polygonal shape and a second shaft having a rear end having a recess formed therein in a shape corresponding to the front end of the first shaft so as to be axially connected to the first shaft and a middle portion having a small diameter to have an adjustment recess formed therein, and the housing accommodating the rear end of the first shaft and the motor;
a cutting unit comprising a cutting tip mounted to a front end of the second shaft;

a tube-mounting unit formed in a pipe shape, wherein the tube-mounting unit is connected to a front portion of the housing to accommodate the cutting unit, and wherein the tube-mounting unit allows a tube to be cut to be mounted in a front end portion thereof so as to be concentric therewith; and an adjustment unit comprising:
- a bearing inserted into the adjustment recess and having a moving protrusion formed to extend outwards, wherein the moving protrusion is configured to move the second shaft forwards or backwards upon application of external force; and
- a return spring configured to return backwards the moving protrusion and the second shaft that have been moved forwards by external force.

2. The tube-facing machine according to claim 1, wherein the cutting tip is formed in a polyhedral shape,
wherein a blade is formed at an edge of one surface of the cutting tip, and
wherein, in the one surface of the cutting tip, a depressed portion having a depressed shape is further formed along a direction in which the blade is formed.

3. The tube-facing machine according to claim 2, wherein the depressed portion is formed to have an arc-shaped side-section.

4. The tube-facing machine according to claim 3, wherein the depressed portion is formed such that a diameter thereof gradually increases in one direction, and
wherein the cutting tip is disposed to be in contact with the tube such that a portion of the depressed portion having a largest diameter is oriented toward an outside of the tube.

5. The tube-facing machine according to claim 1, wherein the adjustment unit further comprises:
a guide bushing formed in a pipe shape, the guide bushing having a front end fixed to the tube-mounting unit, a rear end fixed to the housing, and a guide slot formed in a side surface thereof and extending to a predetermined length in a forward-backward direction, and
wherein the moving protrusion is inserted into the guide slot, whereby a range within which the moving protrusion moves in the forward-backward direction is restricted.

6. The tube-facing machine according to claim 5, wherein the adjustment unit further comprises:
- a moving member formed in a shape of a pipe having a predetermined length and surrounding the guide bushing, wherein the moving member has a protrusion-receiving recess formed in an inner surface thereof to receive an upper end portion of the moving protrusion and a screw groove formed in an outer surface thereof, and wherein the moving member moves along an outer surface of the guide bushing in the forward-backward direction; and
- an adjustment member formed in a pipe shape, the adjustment member being disposed outside the moving member and coupled to the moving member in a screw engagement manner,
wherein the moving member is moved forwards or backwards in response to rotation of the adjustment member,
wherein the return spring has one end fixed to the adjustment member and an opposite end fixed to a front end of the housing and is configured to be torsionally deformed in response to rotation of the adjustment member upon application of external force, and
wherein, when the external force is removed, the return spring is restored to an original shape thereof and returns the moving member to an original position of the moving member.

* * * * *